United States Patent Office 3,315,581
Patented Apr. 25, 1967

3,315,581
SINGLE LENS MIRROR REFLEX CAMERA PROVIDED WITH EXPOSURE METER
Hans Rühle and Josef Schwahn, Stuttgart, Germany, assignors to Zeiss Ikon Aktiengesellschaft, Stuttgart, Germany
Filed Sept. 22, 1964, Ser. No. 398,196
Claims priority, application Germany, Oct. 4, 1963, Z 10,394
3 Claims. (Cl. 95—42)

The invention relates to a single lens mirror reflex camera which for exposure measurement has fixedly mounted in the exposure chamber outside of the objective light beam and the viewfinder light beam a photosensitive cell, such as a photoconductive element or a photoelectric resistance, which by means of light beam deflecting means is intermittently exposed to the light passing through the camera objective.

It is advantageous to illuminate the photoelectric cell by the objective light beam, because then at least some of the factors critical for the exposure of the film are included in the light measurement. Heretofore the light beam deflecting means necessary for this purpose were pivotally mounted in the exposure chamber in order to be removed from the objective light beam so that the latter can expose the film. As known, it is desirable to keep the exposure chamber as small as possible. Since in this chamber already the flap mirror producing the viewfinder image has to be swingably accommodated, it is difficult to arrange additional swingable deflecting means in the exposure chamber, the more so, since additional control means are required for carrying out the swing operation synchronously with that of the flap mirror and other control members in the camera.

It is the object of the invention to avoid these disadvantages without relinquishing a favorable stationary arrangement of the photoelectric cell in the exposure chamber. The invention resides in this, that as light beam deflecting means a partially transmissive reflecting layer is used in combination with the flap mirror of the camera, which layer is fixedly arranged between the flap mirror and the viewfinder ocular, preferably in the area in front or in back of the viewfinder focusing plane, and is inclined with respect to the viewfinder axis. By utilizing the flap mirror which is already present in the camera, no additional swingable deflecting means are required so that the exposure chamber need not be enlarged for the purpose of accommodating the light measuring device.

A further substantial advantage of the invention consists in that any disturbing secondary light which may pass through the ocular, is projected by a field lens arrangement into the objective aperture and is thereby kept away from the photoelectric cell.

The photoelectric cell is preferably arranged in the vicinity of the camera front wall in the exposure chamber, preferably near the objective mount, as these portions in the interior of the camera casing are located directly in the area of the light beam bundle for illuminating the photoelectric cell. By the employment of additional reflecting surfaces fixedly arranged in the exposure chamber, the photoelectric cell, however, may also be arranged in places which are not directly struck by the illumination light beam bundle.

If the photoelectric cell is to lie in a plane conjugate with the exit pupil of the objective, the partially transmissive mirror layer will be given a projecting effect for the purpose of projecting the objective exit pupil and will therefore be made concave or convex.

In accordance with the invention the partially transmissive reflecting layer which is to be arranged inclined with respect to the viewfinder axis in compliance with the function assigned to it, may be located at any place between the flap mirror and the viewfinder ocular, such as immediately in front or in back of the ocular or, in the case of a multi-membered ocular, between the individual lenses. In the latter case the two ocular lenses are combined to form a prism body having a section in which the partly transmissive reflecting layer is inclined to the optical axis and, if called for, is curved.

Another possibility for accommodating the partly transmissive reflecting layer is that it is applied with a uniform thickness onto a concave glass plate which is fixedly arranged between the flap mirror and the viewfinder focusing plane, in the immediate neighborhood of the latter. The plane in which the viewfinder image is produced will be somewhat displaced by the interposition of this glass plate. This may be offset by a corresponding arrangement of the focusing means.

The partly transmissive reflecting layer may also be applied to the field lens which is provided for brightening up the viewfinder image, whereby a plane or a curved outer surface of this lens can be used. In order to assure the required inclination of the partly transmissive reflecting layer, the field lens which is used as a carrier for this layer would have to be arranged somewhat inclined to the optical axis. If this should be disturbing to the projective function assigned to this field lens, additional rectifying means could be provided.

The field lens may furthermore serve in a different way as carrier of the partly transmissive reflecting layer in that it is divided along a plane or a curved section which is inclined to the optical axis, and the reflecting layer is then applied to one of the sectional areas. The two lens portions are thereupon reunited by cementing them together.

As a carrier for the partly transmisive reflecting layer may also be used the penta roof edge prism which is customarily used in a mirror reflex camera. Since this reflecting layer must be inclined with respect to the optical axis, the prism entrance face to which the reflecting layer is applied will be correspondingly inclined. Any possible deviation of the viewfinder light beam within the prism caused by this inclination may be counteracted by a different positioning of its reflecting faces. Such a correction of the prism, however, is not necessary if the reflecting layer which is arranged inclined to the optical axis, is covered by a glass wedge which reestablishes a prism entrance face that is positioned perpendicularly to the optical axis. Also in this arrangement the partly transmissive reflecting layer may be curved in order to accommodate the desired projection of the objective exit pupil onto the photoelectric cel.

It may not always be possible to produce the image of the objective exit pupil on the photoelectric cell by a special shaping of the reflective layer. Therefore, additional projecting means are provided in the illumination light beam focussed on the photoelectric cell. These additional projecting means permit the formation of an intermediate image of the exit face on the photoelectric cell and may be fixedly arranged, without disturbing the formation of the viewfinder image, outside of the viewfinder light beam in the exposure chamber. Since by the intended light measurement only the illumination density in the exit aperture is measured, no high requirements need be placed upon the projective properties of such a lens. Consequently, such projecting means may be molded or pressed of plastics. Depending on the position of the intermediary image of the exit pupil, this lens may simultaneously serve as carrier of the photoelectric cell.

For the foregoing observations it is irrelevant whether the light measuring takes place by means of a photoelectric element or of a photoelectric resistance.

The invention will be further explained with reference to the accompanying drawings, in which The FIGS. 1, 2, 3 and 4 illustrate diagrammatically each a different arrangement of a partially transmissive reflecting layer in a single lens mirror reflex camera for illuminating the photoelectric element or photoconductive resistance of an exposure meter.

Figures 1, 2:
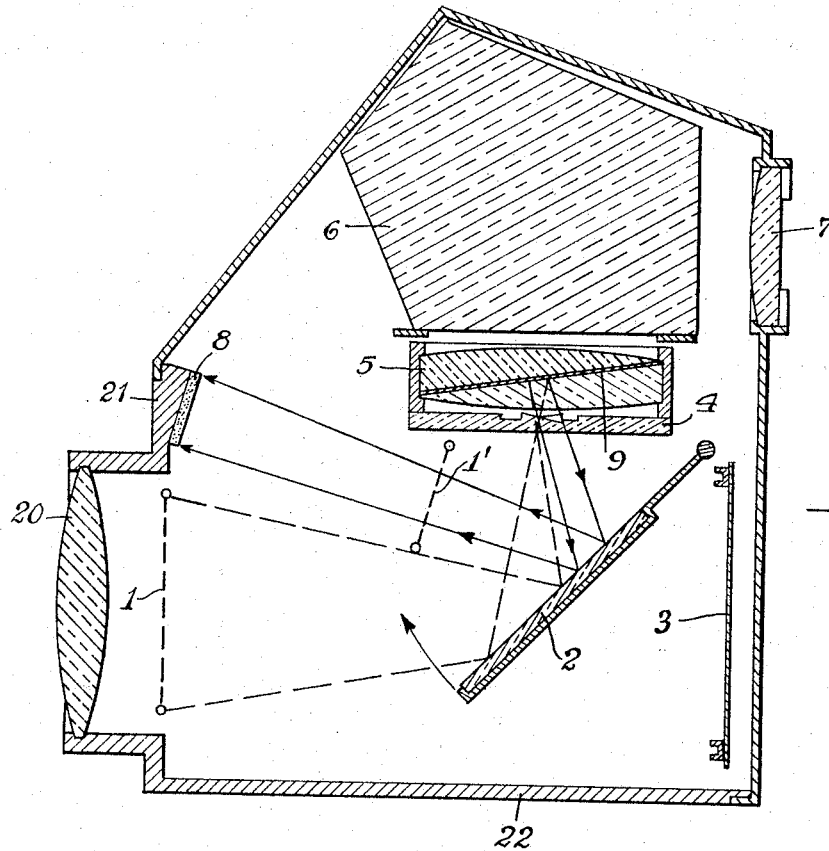

In all of the FIGS. 1 to 6 the exit pupil of the camera objective of a single lens mirror reflex camera is designated with 1, while the reference numeral 2 denotes the flap mirror, and 3 indicates the position of the photographic film to be exposed. In the viewfinder position the mirror 2 reflects the light beam coming from the objective 20 to the focusing plane of the focusing plate 4. The viewfinder image is projected into the ocular 7 by means of the field lens 5 and the penta roof edge prism 6. In the FIGS. 1, 2 and 4 the photoelectric cell 8 is attached to the interior of the camera front wall 21 in the vicinity of the mount of the objective 20, while in FIG. 3 the photoelectric cell 8 is mounted on the bottom wall 22 of the camera, and a fixedly arranged mirror 11 reflects the light coming from the partially transmissive reflecting layer 9 onto the photoelectric cell 8.

All embodiments of the invention have in common that the light beam emitting from the exit pupil 1 is partly reflected by the partially transmissive reflecting layer 9 back to the flap mirror 2 and from there is deflected toward the photoelectric cell 8.

If in the embodiment shown in FIG. 1 the partly transmissive reflecting layer 9 is arranged in the field lens 5, the projection of the exit pupil 1 takes place already in the position designated with 1′. This is due to the convex surface of the field lens which is traversed by the light beam bundle destined for the photoelectric cell 8. In order to transfer this image plane 1′ to the photoelectric cell 8, either additional projection means may be used, or the mirror layer 9 is curved for offsetting the effect of the field lens.

In the embodiment illustrated in FIG. 2 the partly transmissive reflecting layer 9 is arranged within the penta prism 6. It is covered by a glass wedge 6′ which causes the viewfinder light beam to enter the penta roof edge prism perpendicularly. Since in this arrangement the two convex faces of the field lens 5 influence the light beam focussed upon the photoelectric cell, the image of the exit pupil 1 is projected still closer to the flap mirror 2 than in the arrangement disclosed in FIG. 1. Also in this embodiment the partly transmissive reflecting layer 9 may be made convex to such an extent that the influence of the field lens is counteracted. Obviously, image projecting means provided in the illumination light beam may replace or supplement the curved configuration of the partly transmissive reflecting layer.

Figure 3:
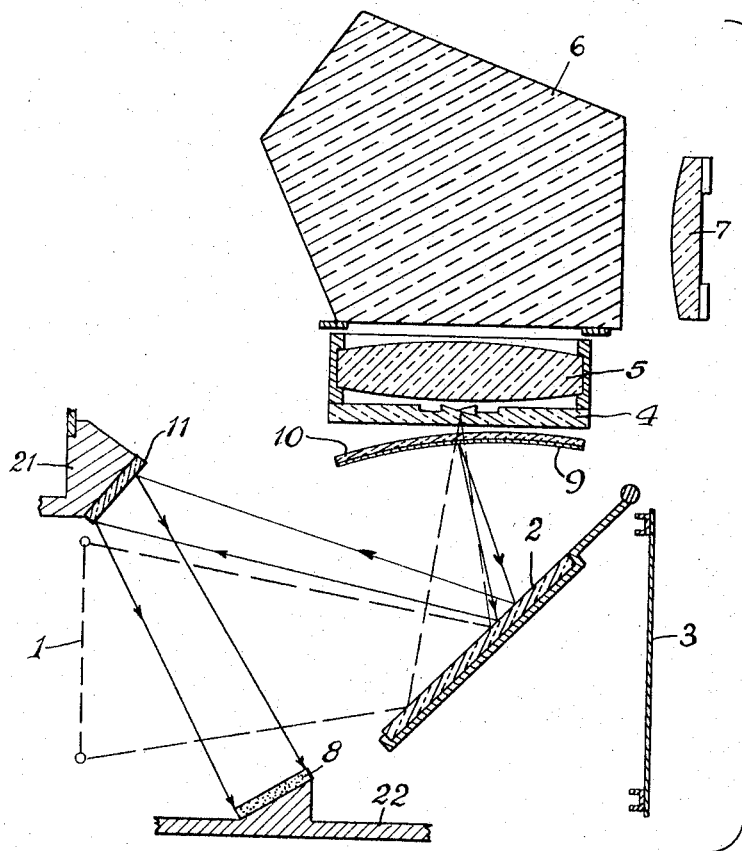

In FIG. 3 is used as a carrier for the reflecting layer a convex glass plate 10 of uniform thickness. This glass plate 10 is fixedly mounted in the exposure chamber and as a whole is inclined toward the optical axis and is arranged immediately in front of the focussing plate 4. The glass plate 10 is so shaped that the objective exit pupil 1 is positioned in its center of curvature. This has the result that also the image of the exit pupil comes to lie in this center of curvature and, accordingly, the photoelectric cell 8 is spaced the same distance from the flap mirror 2 as the exit pupil 1.

The glass plate 10 which is arranged in front of the viewfinder may cause a minor displacement of the focussing plane which can be corrected by a suitable adjustment of the focussing plate 4.

Figure 4:
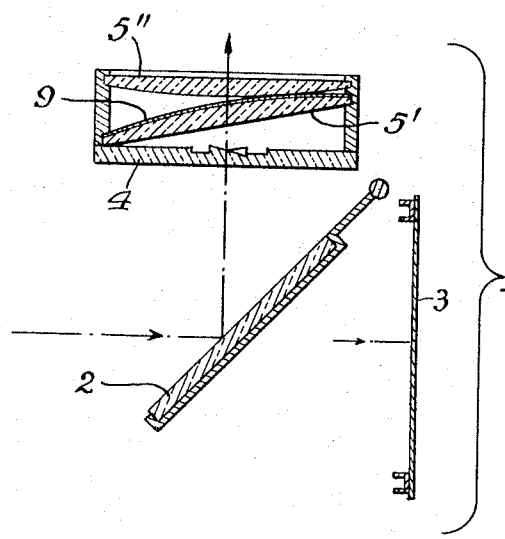

In the embodiment illustrated in FIG. 4 the field lens consists of two separate lenses 5′ and 5″. In this arrangement either the convex face or the plane face of the lens 5″ may serve as a carrier for the partly transmissive reflecting layer. This face, however, would have to be arranged inclined with respect to the optical axis.

Figure 5:
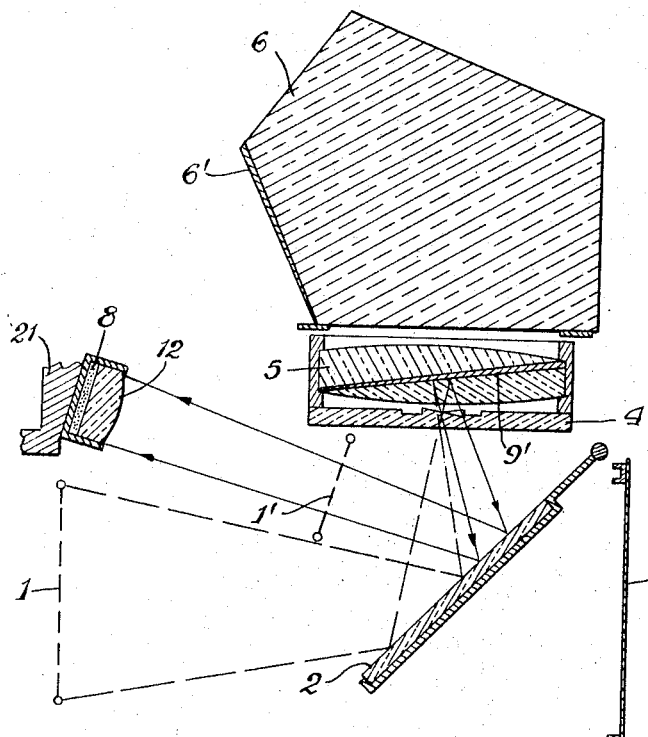
FIG. 5 illustrates an embodiment of the invention in which the photoelectric element is carried by a plano-convex projection lens element and in which the partially transmissive reflecting layer is wedge-shaped in cross section.

According to the modification of the invention as shown in FIG. 5, a plano-convex lens element 12 is mounted with its plane surface onto the front face of the photoelectric element 8 for projecting onto the latter the exit pupil of the camera objective. It will be noted that the lens element 12 may be considered as a carrier for the photoelectric element 8.

FIG. 5 also illustrates that the partially transmissive reflecting layer 9′ may have a wedge-shaped cross-section for suppressing excessively bright image portions of the subject to be photographed, for instance the sky area. In addition to this layer 9′ is arranged on the reflecting face of the prism 6 a corresponding wedge-shaped mirror layer 6′ for assisting in making the viewfinder image uniformly bright. These wedge-shaped mirror layers, at least the one designated with 6′, may also be arranged at other points in the viewfinder light beam.

Figure 6:
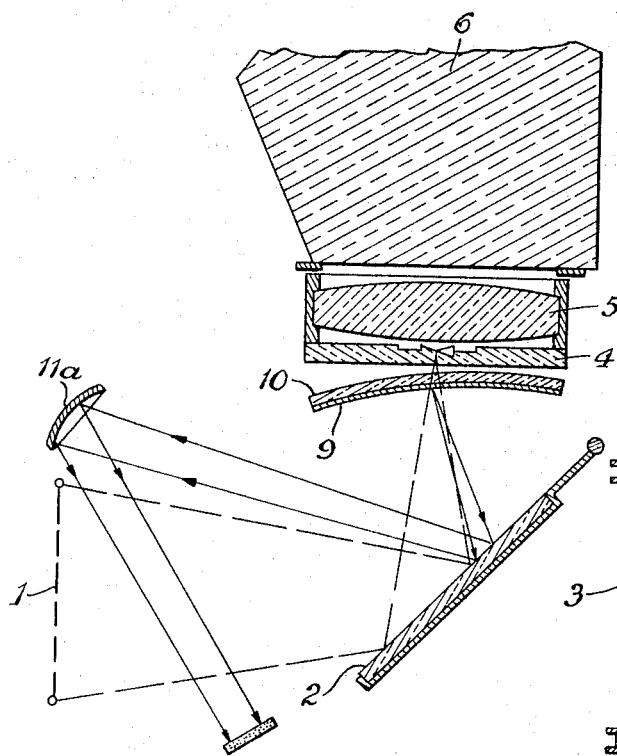
FIG. 6 illustrates the employment of a concave mirror for deflecting light rays from the partially transmissive reflecting layer onto the photoelectric element.
Figure 7:
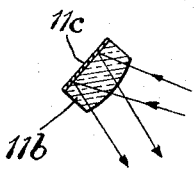
FIG. 7 illustrates the alternate employment of a plano-convex lens with a mirror thereon in the embodiment shown in FIG. 6.

FIG. 6 illustrates that the plane mirror 11 shown in FIG. 3 may be replaced by a concave mirror 11a as a light beam deflecting means, while FIG. 7 shows that the mirror 11 may be replaced by a plano-convex lens 11b on the plane face of which a mirror layer 11c is placed.

What we claim is:

1. In a single objective lens mirror reflex camera having a camera chamber, a viewfinder, a viewfinder ocular, a pivotally mounted flap mirror for deflecting the light rays passing through the camera objective into the focussing plane of said viewfinder when the latter is in its operative position, a focussing plate to receive light rays from the exit pupil of said objective, a photoconductive element mounted in said chamber offset from said objective for an exposure meter, said photoconductive element being arranged within said camera to be illuminated by a portion of the light rays which are deflected by said flap mirror into said viewfinder, a partially transmissive reflecting layer adjacent said focussing plate, said portion of the light rays being deflected onto said photoconductive element by said partially transmissive reflecting layer being arranged fixedly in rear of said focussing plate, said partially transmissive reflecting layer being combined with a field lens which forms a part of said viewfinder and is arranged between said focussing plate and said penta roof edge prism, said field lens being divided by a section arranged inclined to the optical axis into two parts, and said partially transmissive reflecting layer being arranged on one surface of one of said two parts of said field lens, whereby light rays from the exit pupil of said objective will be reflected from said partially transmissive layer back to said flap mirror and onto said photo-conductive element.

2. A single lens mirror reflex camera according to claim 1, including projecting means fixedly attached to said photoconductive element for projecting onto the latter the exit pupil of the camera objective.

3. A single lens mirror reflex camera according to claim 1, including projecting means fixedly attached to said photoconductive element for projecting onto the latter the exit pupil of the camera objective, said projecting means serving as a carrier for said photoconductive element.

References Cited by the Examiner

UNITED STATES PATENTS 3,103,150  9/1963  Lange _____ 95—42 X
3,163,097  12/1964  Zenyoji _____ 95—42 X

FOREIGN PATENTS 1,315,377  12/1962  France.

JOHN M. HORAN, *Primary Examiner.*